United States Patent
Westphal

(10) Patent No.: US 7,313,152 B2
(45) Date of Patent: Dec. 25, 2007

(54) IP HEADER COMPRESSION DEPENDENT CONNECTION ADMISSION CONTROL AND/OR CHANNEL ALLOCATION

(75) Inventor: Cedric Westphal, San Francisco, CA (US)

(73) Assignee: Nokia Corporation, Espoo (FI)

( * ) Notice: Subject to any disclaimer, the term of this patent is extended or adjusted under 35 U.S.C. 154(b) by 949 days.

(21) Appl. No.: 10/187,383

(22) Filed: Jun. 28, 2002

(65) Prior Publication Data
US 2003/0165122 A1 Sep. 4, 2003

Related U.S. Application Data

(60) Provisional application No. 60/360,778, filed on Mar. 1, 2002.

(51) Int. Cl.
H04J 3/22 (2006.01)
(52) U.S. Cl. ............... 370/468; 370/395.41; 455/452.2
(58) Field of Classification Search ................. 370/329, 370/468
See application file for complete search history.

(56) References Cited

U.S. PATENT DOCUMENTS 6,597,705 B1 * 7/2003 Rezaiifar et al. ........... 370/468
6,907,243 B1 * 6/2005 Patel ........................ 455/442
7,006,472 B1 * 2/2006 Immonen et al. ........... 370/332
2002/0093938 A1 * 7/2002 Tourunen ................... 370/349
2002/0147020 A1 * 10/2002 Iguchi et al. ............... 455/452

* cited by examiner

Primary Examiner—Chi Pham
Assistant Examiner—Phuc Tran
(74) Attorney, Agent, or Firm—Harrington & Smith, PC

(57) ABSTRACT

The use of bandwidth constrained wireless links in mobile networks necessitates the use of bandwidth saving header compression schemes. In these schemes, a compressor and a decompressor collaborate to code bulky IP headers into streamlined compressed headers. The gain of establishing the compressed header state in a greedy manner, without the compressor waiting for the decompressor's acknowledgment is evaluated. The impact of header compression on the traffic pattern, and the consequences on the channel allocation or connection admission control are also evaluated. A decision method for channel allocation or for connection admission control are proposed that maximizes the bandwidth utilization of the channel while providing some performance guarantees in terms of delay.

23 Claims, 8 Drawing Sheets

DELAY vs. PAYLOAD UTILIZATION

DELAY vs. PAYLOAD UTILIZATION

MEAN DELAY vs. PAYLOAD UTILIZATION

DELAY vs. NUMBER OF CONCURRENT SOURCES

DELAY vs. NUMBER OF CONCURRENT SOURCES

IP HEADER COMPRESSION DEPENDENT CONNECTION ADMISSION CONTROL AND/OR CHANNEL ALLOCATION

RELATED APPLICATION

This utility patent application is a continuation of a previously filed U.S. provisional patent application, U.S. Ser. No. 60/360,778 filed on Mar. 1, 2002, the benefit of the filing date of which is hereby claimed under 35 U.S.C. §119(e).

FIELD OF THE INVENTION

The present invention relates to mobile IP networks, and more particularly to connection admission control or channel allocation in a network using IP header compression.

BACKGROUND OF THE INVENTION

With the immense growth of the Internet and of mobile networks, the convergence of the two networks is considered inevitable. In a mobile Internet, the problem of efficiently carrying the Internet Protocol (IP) over mobile networks is critical, since the IP protocol has enjoyed the comfort of relatively higher bandwidth links and lower transmission errors. In a mobile network, such as a wide-area cellular network, lower link bandwidth necessitates that the IP header overheads are minimized in order to better utilize the link capacity to deliver useful payload to applications. The challenge for header compression in such links is to be robust against higher channel errors and also be sensitive to longer Round-Trip Times (RTTs). The [rohc] working group in the IETF has undertaken work to specify a robust header compression protocol for operation over lossy links with longer latencies.

Briefly, a robust header compression algorithm functions using a compressor and a decompressor. The compressor begins by sending packets with Full IP headers, until it gains sufficient confidence that the decompressor has received the required information, called Full Context. The point of such a determination is to allow subsequent header compression to operate with as small number of header bits as possible. This context initialization phase is important since it forms the basis for both the compressor and the decompressor to progress towards spectrally efficient state using a consistent reference state. However, it creates a bursty traffic pattern, consisting of some Full Header packets that require a large amount of bandwidth, followed by some compressed packets that require a significant smaller amount of bandwidth. Bandwidth allocation or Connection Admission Control (CAC) is thus complicated by the Header Compression scheme. Allocating the minimal amount of bandwidth or accepting the maximum number of connections while giving enough room for the header compression context initialization burst is a difficult task, yet of tremendous importance.

It is with respect to these considerations and others that the present invention has been made.

SUMMARY OF THE INVENTION

The present invention is directed at addressing the above-mentioned shortcomings, disadvantages and problems, and will be understood by reading and studying the following specification.

The use of bandwidth constrained wireless links in mobile networks necessitates the use of bandwidth saving header compression schemes. In these schemes, a compressor and a decompressor collaborate to code bulky IP headers into streamlined compressed headers. The gain of establishing the compressed header state in a greedy manner, without the compressor waiting for the decompressor's acknowledgment is evaluated. The impact of header compression on the traffic pattern and the consequences on the Channel Allocation (CA) and on Call Admission Control (CAC) is also evaluated. A formal basis for context management during handovers in mobile networks is provided. For example, there may be significant benefit in relocating compression contexts (from one network node to another) rather than to re-establish them each time during handovers, and this influences the CA and the CAC at the new access point after handoff.

DETAILED DESCRIPTION OF THE PREFERRED EMBODIMENTS

Figure 1:
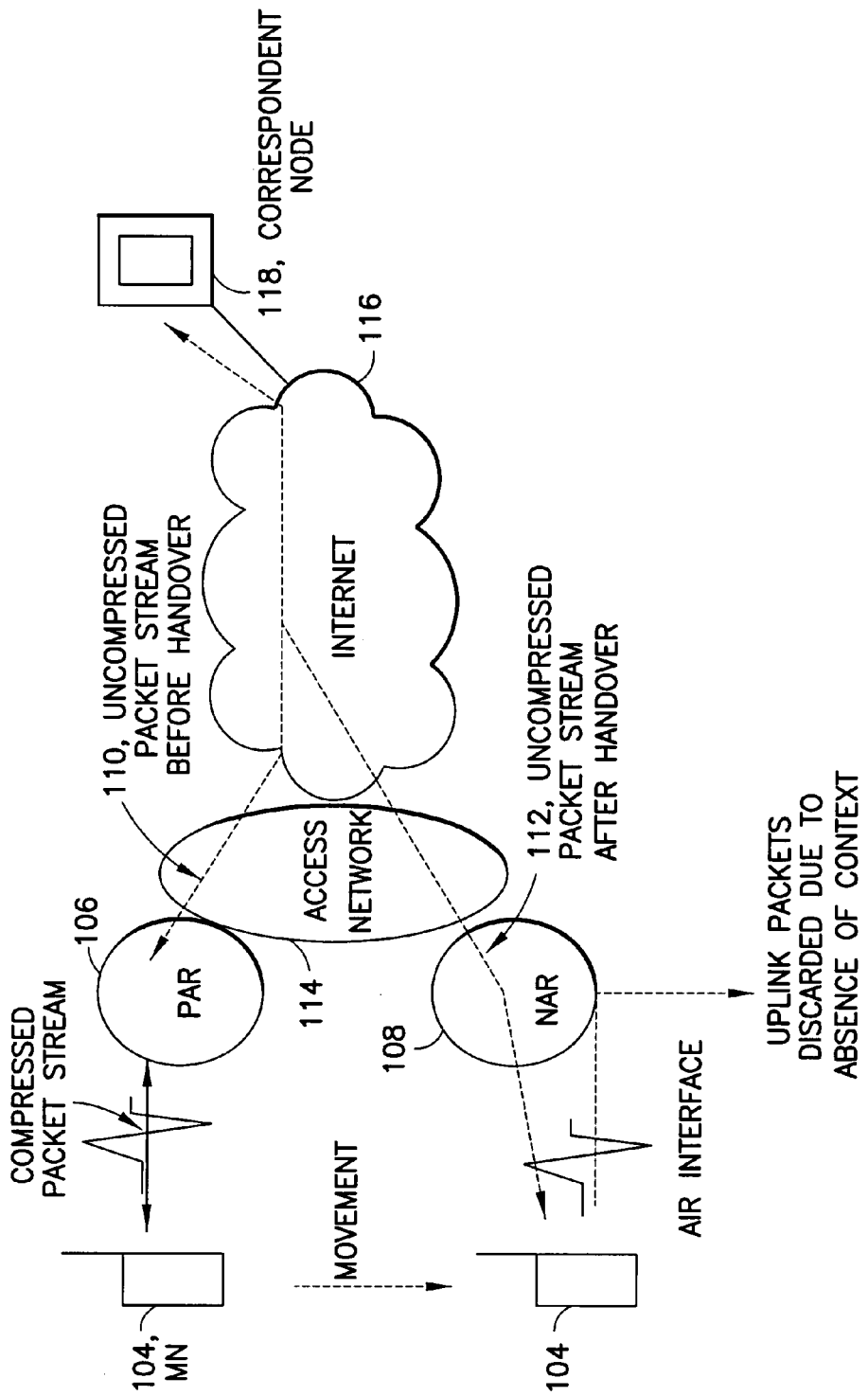
FIG. 1 illustrates a mobility reference diagram.

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims and their equivalents.

Referring to the drawings, like numbers indicate like parts throughout the views. Additionally, a reference to the singular includes a reference to the plural unless otherwise stated or is inconsistent with the disclosure herein.

I. Introduction

The present invention is directed at compression context establishment. The impact of the header compression context establishment on the traffic pattern is evaluated, and subsequently on channel allocation. A channel allocation scheme is provided which takes into account the particular traffic patterns created by the header compression scheme.

The discussion is organized as follows. In Section II, the basic model is presented. In Section III, some mechanisms are described to handle the burst due to context re-initialization for different channel allocation schemes. These results are derived for constant bit-rate channels, shared signaling and shared access channels. Some simulation results are provided in IV-C and a conclusion is provided in Section V.

II. Basic Model

An embodiment of the network model is as follows. For purposes of this 15 discussion, the Mobile Nodes use IPv6 as the IP layer protocol and they use Mobile IPv6 as the mobility management protocol. However, the results are applicable to IPv4 and Mobile IPv4 with appropriate header size values. It follows that the access point a Mobile Node (MN) attaches to is a router capable of understanding IPv6 and supports IPv6/UDP/RTP header compression, wherein the access point is selected from an Access Router and a Base Station. Furthermore, each MN (104) undergoes handover from a Previous Access Router (106) to a New Access Router (108), bringing with it packet streams (110, 112) undergoing header compression. See FIG. 1. FIG. 1 as illustrated includes MNs 104, previous access router (PAR) 106, new access router 108, packet streams 110 and 112, access network 114, Internet 116, and correspondent node 118.

Most of the actual IPv4 traffic has small packet sizes. For instance, a median packet size of 93 bytes, and 25% of IPv4 packets have a size less than 40 bytes. This corresponds, since the IPv4 header size is 20 bytes, to the payload sizes of 73 bytes and 20 bytes respectively. When Mobile IPv6 is considered, however, the header overhead of 84 bytes (for IPv6/UDP/RTP) exceeds the median payload size and is actually more than four times the payload size corresponding to the 25% of the packets. As a result, many different applications may be candidates for header compression. We consider a Voice over IPv6 application here since it has a small payload and a large header. For instance, assuming Mobile IPv6 and RTP for the voice application means the Full Header size is 84 bytes. In contrast, for 9.6 Kbps sampling (which we assume here), the voice payload is 24 bytes. An assumption is made that average compressed header size is 4 bytes so that a packet with compressed header is one-third the size of a Full Header. Furthermore, assume that a MN (104) engages in active header compression for one or more packet streams while attached to a Previous Access Router (PAR) (106), and then undergoes handover to a New Access Router (NAR) (108). Assume that the NAR (108) does not concurrently possess the compression context together with PAR (106), and hence needs to establish context(s) on its own.

Also assume that IP sessions, such as a Voice over IP session, are generated according to a Poisson process. This is a fairly general assumption that follows from large user pool and independent behaviors of users. Note however that, the class of session requests, or connections, that are generated according to a pre-defined schedule would not fit in this model. This means, if a server periodically pushes state to the MN, such as MN 104, e.g., a stock quote, this connection process does not follow the Poisson model. On the other hand, if the server simply stores the state, and the user of the Mobile Node fetches this state on-demand, such a connection request would still follow the Poisson model. In summary, pure client-server connection requests follow the model while the push model does not.

Also assume the handover arrival process follows a Poisson process. This is a consequence of the Poisson assumption of the connection initiation process whenever there is no blocking. Blocking means the rejection of a call due to limited capacity at the access router.

Figure 2:
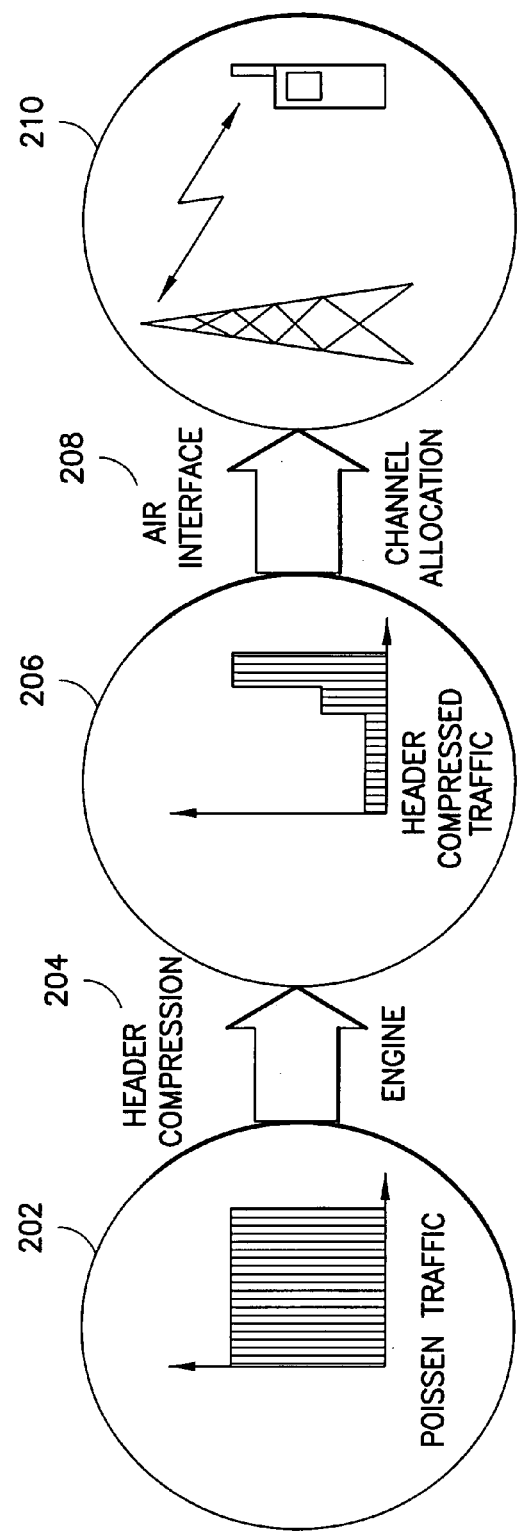
FIG. 2 shows traffic model assumptions.

In FIG. 2, traffic flow is illustrated in which connections arriving according to Poisson process 202 generate Full Header packets which are then compressed by a compression engine (204) creating header compressed traffic 206 and sent over an air interface (208), such as a cellular link (210). The allocation of bandwidth for the compressed traffic is discussed in Section V. The call arrival rate is denoted by λ, and by $\mu^{-1}$ the mean call duration. The sampling interval is τ. This means that calls are initiated according to a Poisson process (202) with rate λ and send a packet every sampling interval τ (typically every 20 or 30 ms) for an exponentially distributed length of time with parameter μ. β denotes the bandwidth request of a connection which is related to the payload size by the relationship β=payload size/τ. Lastly, we define by b the maximum delay allowed on the header compressed link that is acceptable to the user.

The cases are restricted to where a change of the header compression state is created by a handover, or by the initiation of the connection. This assumption is made so as to evaluate the cost of re-establishing the header compression state during a handover. This means that the traffic model does not account for context creation, which produces a burst of Full Header packets, spawned by arbitrary packet losses or due to packets out of order.

Figure 3:
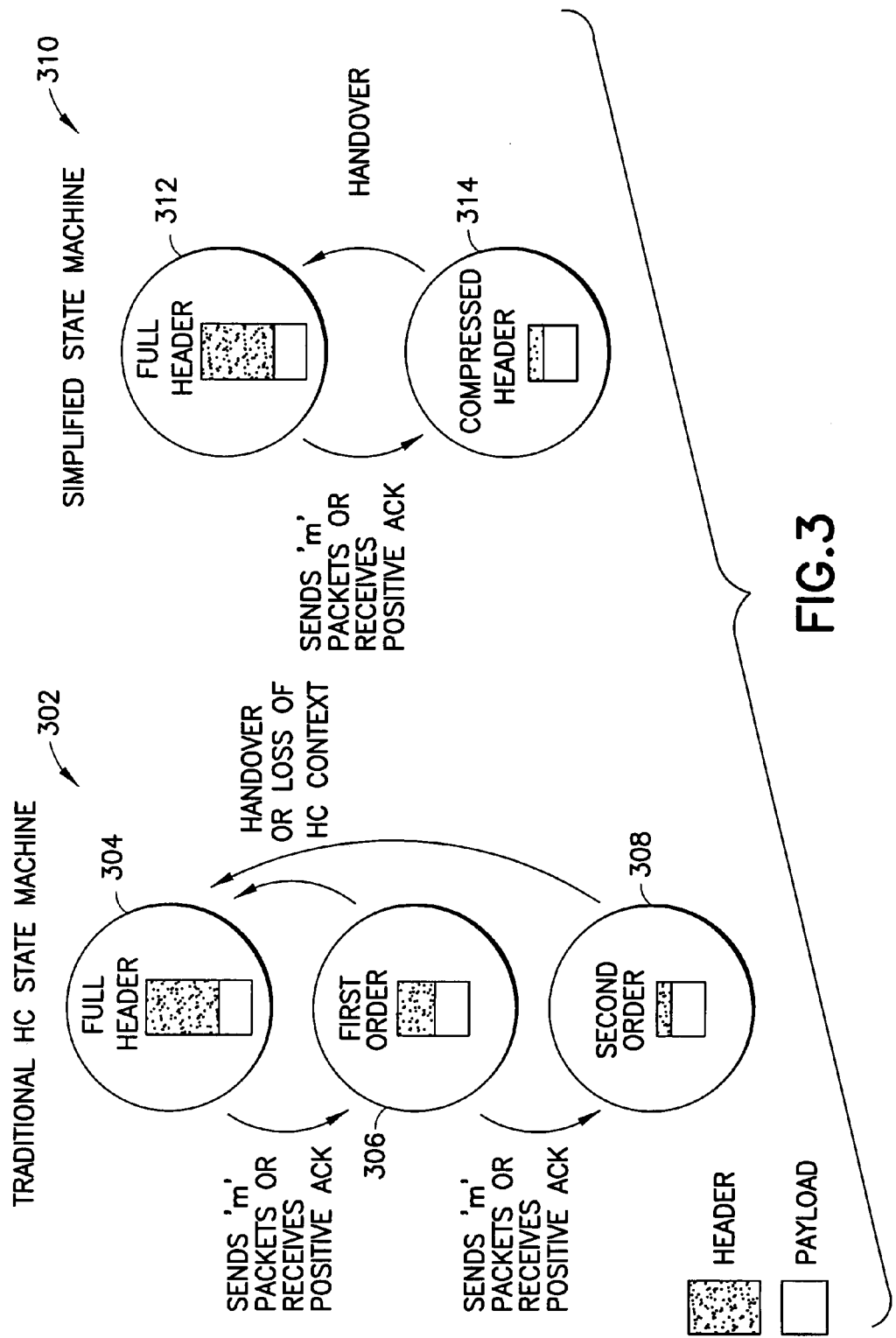
FIG. 3 shows header compression state machines.

FIG. 3 describes the state machine of the model. The traditional state machine (302) typically defines three compressor states, including a full header state (304), a first order state (306), and a second order state (308).Of these three states, the First Order State (306) and the Second Order state(308) are the preferred states in which fewer header bits are sent. According to the present invention, only two states are considered in a simplified state machine (310); a full header (FH) state (312) in which all the header bits are sent and a Compressed Header (CH) state (314) in which the header is compressed, to a smaller or greater extent, depending on the available compression gain and sent. This simplification is made because there is less interest in actual compression gain itself as opposed to understanding the impact of SO states into a single CH state resulting in a two-state machine (310) shown in FIG. 3.

Finally, for the purpose of analysis of optimistic context establishment, assume that the Round Trip Time (RTT) of a packet is larger than the packet interarrival time. Typically, in a voice connection, the interarrival time for packets is between 20-30 ms, and the RTT on a cellular link is of the order of 120 ms. If the RTT is shorter than the interarrival time, then there is little need for unacknowledged establishment of header compression state, since there is no penalty for waiting for the acknowledgment of the header compression. The results on the allocation of the bandwidth described in section V are valid independently of this assumption.

There has been little work in the literature concerning the analysis of header compression context establishment and even less (or no) work surrounding its impact during handovers.

III. Header Compression Burst Management

In this section, the strain of supporting the IPv6 headers over the available resources, primarily the channel bandwidth is discussed. The impact of the IPv6 header compressed traffic patterns on the air interface is also discussed.

Assume that only initial n packets are sent with Full Header. The remaining packets are sent with compressed header. Thus, these initial n packets create a burst over the regular traffic. According to our assumption in section II, the connections that generate such bursts arrive according to a Poisson process. Thus, the behavior of header size variation (i.e., the burst pattern due to FH packets) is considered as a peculiar case of M/G/1 queue.

For instance, a voice connection would send 24 byte packets every 20 ms when sampled at 9.6 Kbps. This voice connection is admitted whenever the channel has some room available. The channel resource manager would then reserve a slice of the spectrum for the corresponding bandwidth 1200 bytes/s. This does not include the header however. If the resource manager allocates enough room for the Full Header, then it allocates (24+84)=108 bytes every 20 ms, i.e. roughly 5000 bytes/s. Note that the resource manager could also allocate slightly more bandwidth, say for instance 1500 bytes/s and buffer some of the packets so as to spread the burst over time. This would however incur delay on the following packets.

Observe that it is sufficient to consider only the load being brought by the Full Headers in order to study the burst introduced by arriving connections. Denote by H the extra load being brought by a Full Header. This extra load is the difference between the uncompressible packet size (payload plus CH's size) and the regular packet size (payload plus FH's size). This extra load H is carried by the first n packets when establishing the header compression context. Going back to FIG. 3, H corresponds to the difference of the packet sizes in the two states of the simplified state machine.

Returning back to the bandwidth allocation for a voice call, we see that allocating 25 bytes per 20 ms, namely 1250 bytes/s would be sufficient for the CH packet including the payload and the 1 byte header. The Full Header packets would create an initial burst that creates a constant delay for all subsequent packets in the flow. Allocating 5000 bytes would be sufficient for the entire flow, with or without header compression. Allocating something within the range of 1250 bytes/s and 5000 bytes/s would create an initial delay from the bulky FH packets, which would slowly subside, as the over-allocation empties the larger FH packets when the CH state is reached.

A bound on the maximum delay that this initial burst introduces on subsequent packets is obtained, since this delay directly affects probability of packet discarding ("overflow probability") due to buffer overflow or due to real-time constraints (even when no buffer overflow happens). For this, assume the arrival of a giant packet of size nH with the first packet, instead of the arrival of the first n packets of size H. See FIG. 4 for an illustration.

Figure 4:
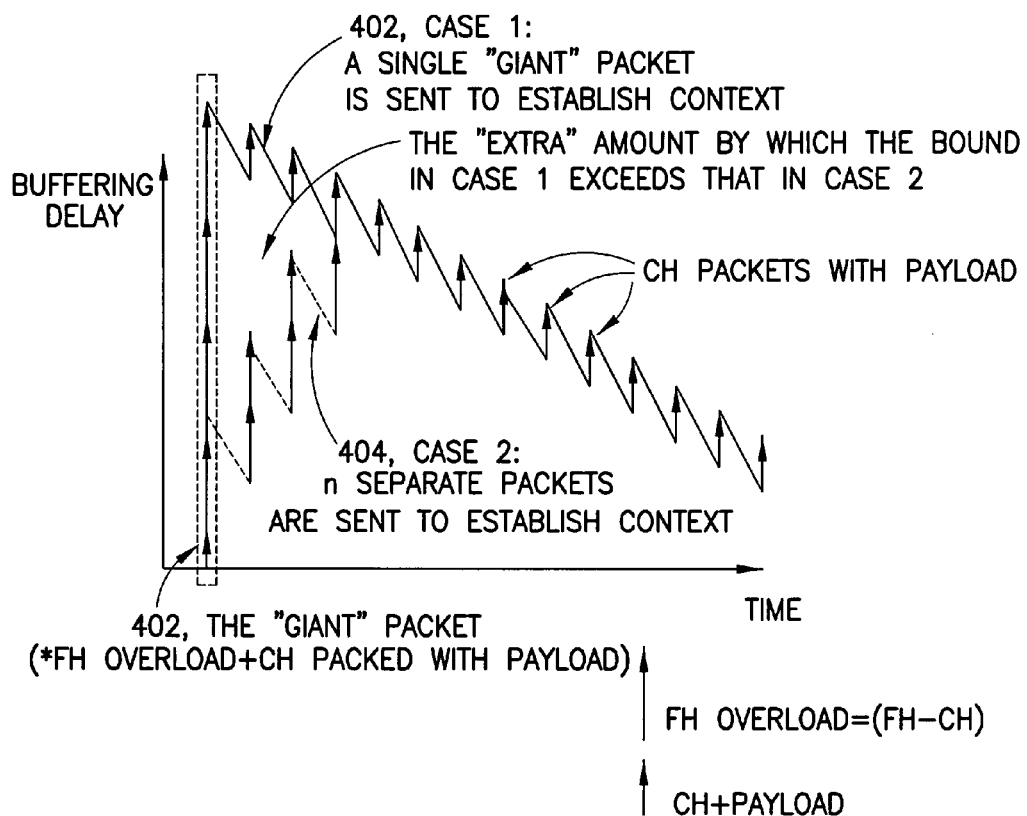
FIG. 4 illustrates the maximum delay brought by the initial FH packets.

From FIG. 4, it is clear that the assumption of the arrival of a giant packet (402) with size nH yields a strict upper bound, since it does not take into account the reduction of the load seen by subsequent packets due to the inter-arrival spread. Yet, if the allocation is such that the initial bulk subsides only slowly, then the delay pattern for the packets n+1, n+2, . . . , is very similar to the case where there are n separate arrivals with size H each (404). The maximum delay however, is incurred for packet n+1.

Now, since the distribution of the arrival of the connection (that triggers this burst) due to handover is according to a Poisson process, and the service time is deterministic (i.e., nH units of service time), we only need to consider a M/D/1 queue. The distribution of the number of handovers being processed in this case is given by:

$p_0 = 1-p$ $p_1 = (1-p)(e^p - 1)$ $$p_n = (1-p) \sum_{j=1}^{n} \frac{(-1)^{n-j}(jp)^{n-j-1}(jp+n-j)e^{jp}}{(n-j)!} \quad \text{EQUATION 1}$$

where p is, as usual in queuing theory, the load given by the product of the arrival rate $\lambda$ of compression context establishment requests into the system and the length of time it takes to establish compression context, namely nH.

Since the channel capacity is finite, only a given number of concurrent requests for context establishment can be served at the same time. Denote by $N_{max}$ the upper bound on the number of handovers. This is an $M/D/1/N_{max}$ system. If we denote by $$a_k = \frac{e^{-\lambda nH}(\lambda nH)^k}{k!} \quad \text{EQUATION 2}$$

the probability that k new connections request context establishment during the normalized processing time of one context establishment, then the distribution of the $M/D/1/N_{max}$ system solves the following triangular system of equations:

$p_0 = p_0 a_0 + p_1 a_0$ $p_1 = p_0 a_0 + p_1 a_1 + p_2 a_0$ $p_j = p_0 a_j + p_1 a_j + p_2 a_{j-1} + \cdots p_{j+1} a_0$ $p_{Nmax-1} = p_0 a_{Nmax-1} + \sum_{j=1}^{N\,max} p_j a_{N\,max-j}$ $\sum_{j=0}^{N\,max} p_j = 1$ EQUATION 3

The $p_j$'s may be deduced as well as the call dropping probability (see below) from 5. It is given by, due to the PASTA property, the following equation:

$P_{overflow} = p_{Nmax}$ (EQUATION 4)

The overflow probability is the probability that the number of requests due to handover into the system exceeds the maximum number of possible concurrent requests for establishing their header compression contexts. This probability will be used in the next section to define some bandwidth allocation schemes.

IV. Solutions to the FH Burst Management Problem

Figure 10:
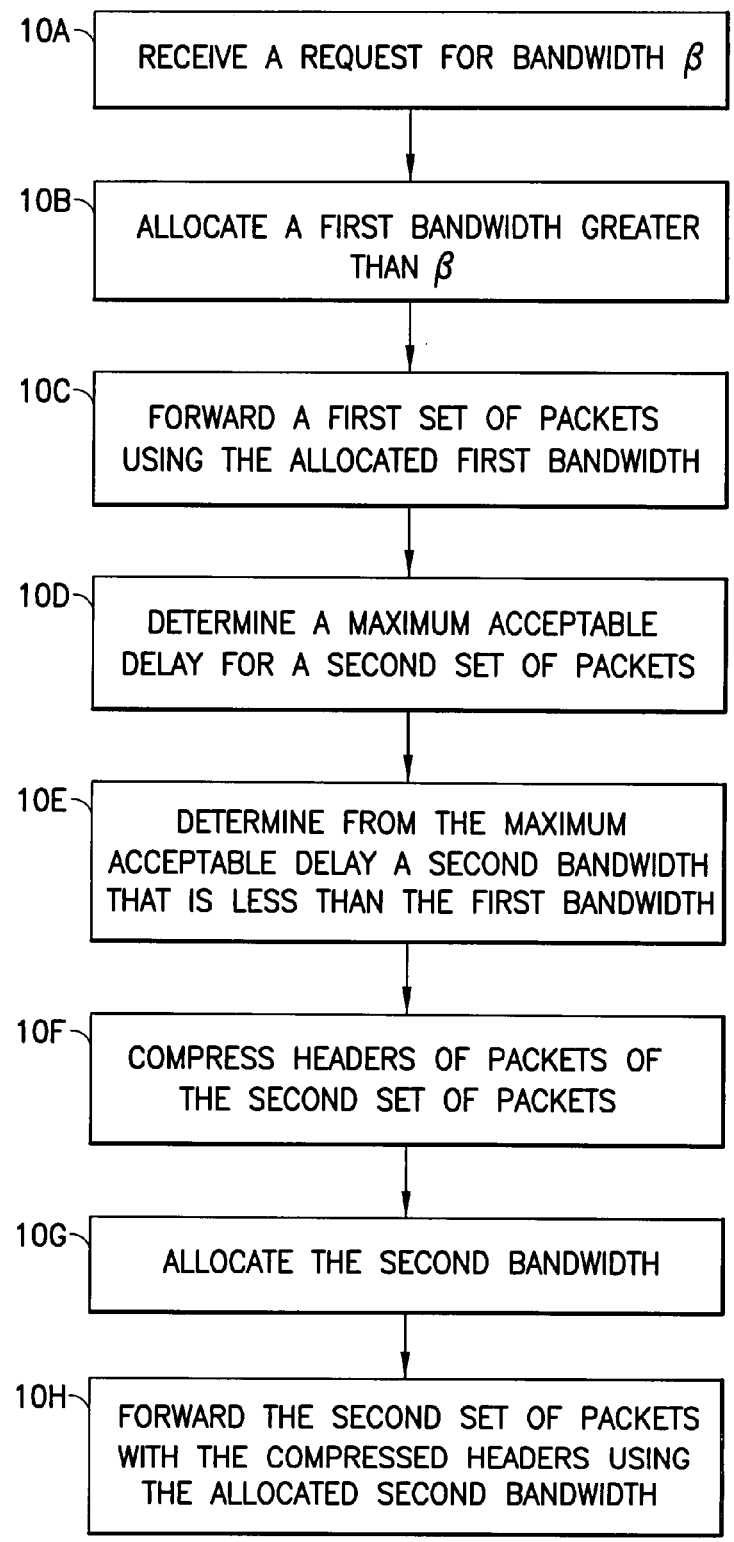
FIG. 10 illustrates a method according to an embodiment of the invention.

Next, solutions are considered to manage the burst introduced by header compression context establishment during handovers. Channel allocation (CA) is considered. However, the same principles, as further illustrated in the flow chart of FIG. 10, could be applied to connection admission control (CAC). The method as illustrated in FIG. 10 includes receiving a request for bandwidth β(10A); allocating a first bandwidth greater than β(10B) and forwarding a first set of packets using the allocated first bandwidth (10C); determining a maximum acceptable delay for a second set of packets (10D); determining from the maximum acceptable delay a second bandwidth that is less than the first bandwidth (10E); compressing headers of packets of the second set of packets (10F); allocating the second bandwidth (10G) and forwarding the second set of packets with the compressed headers using the allocated second bandwidth(10H).

Three types of resource allocations are analyzed, namely Constant Bit Rate (CBR), a channel with shared allocation of the header bursts and reserved bandwidth for the payload, and a totally shared channel allocation.

To compare these scenarios, some performance measures are defined. The term "call dropping probability" is the probability that a call is refused access to the resource due to the inability to allocate some bandwidth to this call. Since call dropping is a widely used term, "call" and "connection" are used interchangeably. This readily applies to the CBR channel. In the shared channel case, there is no call dropping in the strict sense. However, if too many concurrent connections use up the resource, they all suffer. All are "dropped" when the quality degradation, measured by the packet loss due to congestion or by the packet delay, is such that the user cannot continue the call.

The term "maximum channel utilization" is the ratio of the maximum payload throughput over the overall throughput capacity of the channel.

A. Constant Bit Rate Allocation

The symbol "$\alpha$" refers to the bandwidth over-allocation coefficient for a constant bit rate allocation. Recall that $\beta$ is the bandwidth request of a call. The resource manager overprovisions the channel by the coefficient $\alpha$, i.e., for the request of bandwidth $\beta$, it allocates the bandwidth $\beta(1+\alpha)$ to the call. This allocation is constant throughout the life of the connection. This allocation is referred to as Constant Bit Rate allocation.

In one extreme case where $\alpha=0$, that is when the channel allocated has the minimum bandwidth required to accept the flow, then the buffering delay is nH. In the other extreme case, where $\alpha$ is such that $\beta(1+\alpha)$ is greater than the payload plus Full Header rate, gives a zero delay (without considering the jitter).

Thus the maximum added delay to the packets of the connection with allocation coefficient a follows:

$$n\left(\frac{H}{\beta(1+\alpha)} - \tau\right) \text{ which is less than } \frac{nH}{\beta(1+\alpha)} \quad \text{EQUATION 5}$$

Recall that we defined $\tau$ in section II to be the interarrival time between packets of the same flow. Recall as well that $\delta$ is defined to be the maximum acceptable delay of this system. Equation 5 gives the delay for the n+1st packet. The maximum channel utilization in this scenario is $1/1+\alpha$.

For a voice application, assume that an end-to-end delay of 150 ms may be tolerated. Since the wireless links consume some of this delay, generally in the range of 50-70 ms, the buffering delay cannot exceed a fixed delay $\delta$, which is assumed to be 30 ms for illustration. If the request for bandwidth is $\beta=10$ kbit/s, and n=3 packets are needed to establish the CH compression state, each arriving every 20 ms with initial headers of 84 bytes=672 bits, then to satisfy the maximum delay constraint, we need:

$$n\left(\frac{H}{\beta(1+\alpha)} - 20 \text{ ms}\right) \leq \delta$$

i.e., $\frac{H}{\beta(1+\alpha)} \leq 30$ ms $$\alpha \geq \frac{H - 30 \cdot 10^{-3}\beta}{30 \cdot 10^{-3}\beta} = \frac{672 - 300}{300} = 1.24$$

So in this case, overprovision the link so that a request for 10 kbit/s actually gets 22.4 kbit/s.

Assuming a total bandwidth $\beta_T$, then the effective bandwidth is $\beta_T/1+\alpha$, and the number of simultaneous equations is:

$$N_{max} = \beta_T/\beta(1+\alpha) \quad \text{(EQUATION 6)}$$

In order to compute the distribution of calls in this system and the call dropping probability, consider a M/M/1/$N_{max}$ system, with arrival rate $\lambda$ and mean call duration $u^{-1}$. This is classical queuing theory, since there is no variability in the allocation.

The general formula is of the form:

$$pn = \frac{(1-p)p^n}{(1-p^{N_{max}+1})} \quad \text{EQUATION 7}$$

and $P_{Nmax}$ is the call dropping probability.

B. Shared Signaling Channel

Assume that the resource manager allocates a shared channel to establish the compression state. This channel, shared across different flows and users, is used for accommodating the bursts due to FH packets while a separate dedicated channel is assigned for each flow to handle the steadier payload. It thus helps to visualize payload traffic separately from the headers that generate bursts. Note that payload traffic includes a small CH header. The total bandwidth $\beta_T$ is divided between $(1-\alpha_s)\beta_T$ for the payload, and $\alpha_s\beta_T$ for the extra header traffic, where $0 \leq \alpha_s \leq 1$ is the shared channel allocation coefficient. And, $(1-\alpha_s)$ is the maximum payload utilization.

Focusing on the payload, the maximum number of concurrent connections all requesting bandwidth at rate $\beta$ is thus:

$$N_{max} = \alpha_s\beta_T/\beta. \quad \text{(EQUATION 8)}$$

The payload traffic is an M/M/$N_{max}$ queueing system, with arrival rate $\lambda$ and call duration $u^{-1}$, when considered independently from the header bursts. We do not consider the blocking probability, since we are looking for worst case delay bounds.

Given the number $N_{max}$ as a function of $\alpha_s$, we can now identify the extra-header traffic. From section III, the arrival process of the header bursts is an M/D/1/$N_{max}$ queuing system, with Poisson arrival rate $\lambda$ and call duration $u^{-1}$.

The symbol "$N_h$" refers to the maximum number of 'giant' headers in the M/D/1/$N_{max}$ system such that, for a fixed probability $\epsilon$, P(number of requests in the system $$\leq N_h) \geq 1-\epsilon \quad \text{(EQUATION 9)}.$$

Since $N_{max}$ depends on the value of $\alpha_s$, so does $N_h$. Now, to minimize the delay with probability $\epsilon$, $N_h$ needs to satisfy:

$$\frac{N_h nH}{(1-\alpha_s)\beta_T} \leq \delta \quad \text{EQUATION 10}$$

so $\alpha_s$ solves the equation, where the dependency of $N_h$ over $\alpha_s$ is:

Find max$\{\alpha_s \in (0,1)\}$ s.t.

$$nHN_h(\alpha_s) + (1-\alpha_s)\beta_T\delta \leq \delta\beta_T \quad \text{EQUATION 11}$$

Of course, in order to maximize the utilization, pick $\alpha_s$, that achieves the equality in EQUATION 11. The maximum number of concurrent connections is thus:

$$N_{max} = \alpha_s \beta_T / \beta \quad \text{(EQUATION 12)}.$$

Taking the numerical values of the previous subsection, i.e., $\delta$=30 ms, n=3, H=672 bits, $\beta$=10 kbits/s and a channel of size 1 Mbits/s and an arrival rate of $200^{-1}$ calls per second, we compute the value as using the steps described above.

Figure 5:
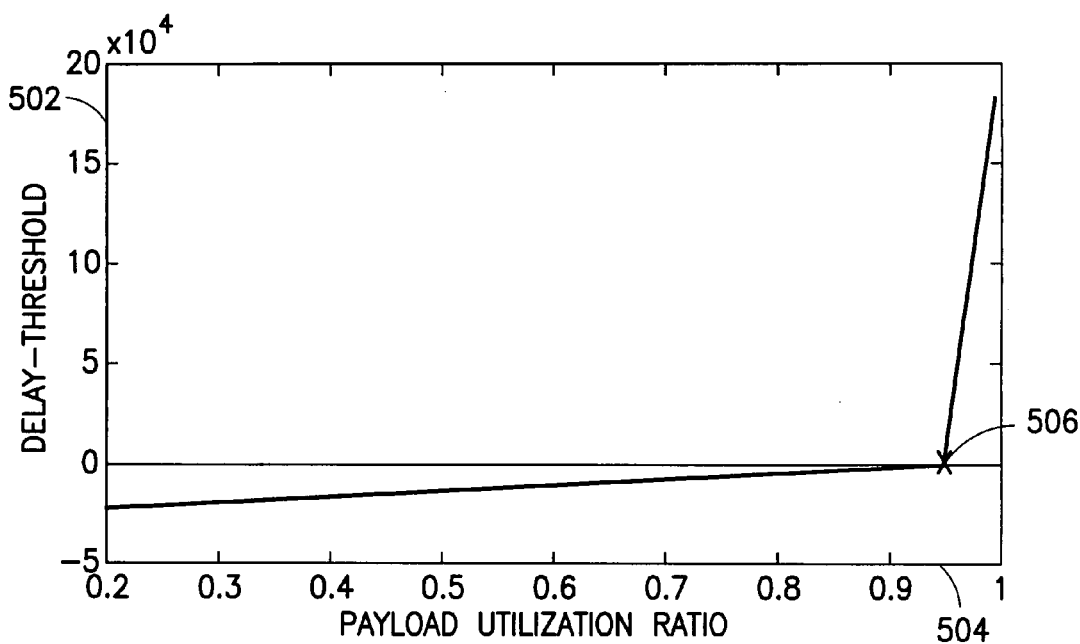
FIGS. 5 and 6 show exemplary delay vs. payload utilization graphs.

FIG. 5 depicts the behavior of the quantity $nHN_h(\alpha_s) + (1-\alpha_s)\beta_T\delta$. The maximum value satisfying the acceptable delay threshold $\delta$ is that value for which this increasing quantity is equal to zero. The y-axis (502) represents the normalized delay, which is delay minus $\delta$. A negative value means it is within the acceptable $\delta$ delay threshold. The payload utilization is the ratio $1-\alpha_s$ allocated to the payload. The value of $N_h$ is such that the probability to exceed the delay is less than 1% (see EQUATIONS 9 and 10).

When increasing the payload ratio (i.e., smaller value of $\alpha_s$), the delay also increases due to congestion involving the header bursts in the shared allocation channel. The graph indicates a tradeoff between better payload utilization at the expense of a longer delay (to establish compression contexts) for the packets.

In FIG. 5, the optimal value of payload utilization is about 95% (506). In comparison, the corresponding value for CBR channel of the previous section is 1/2.24=44.6%.

Figure 6:
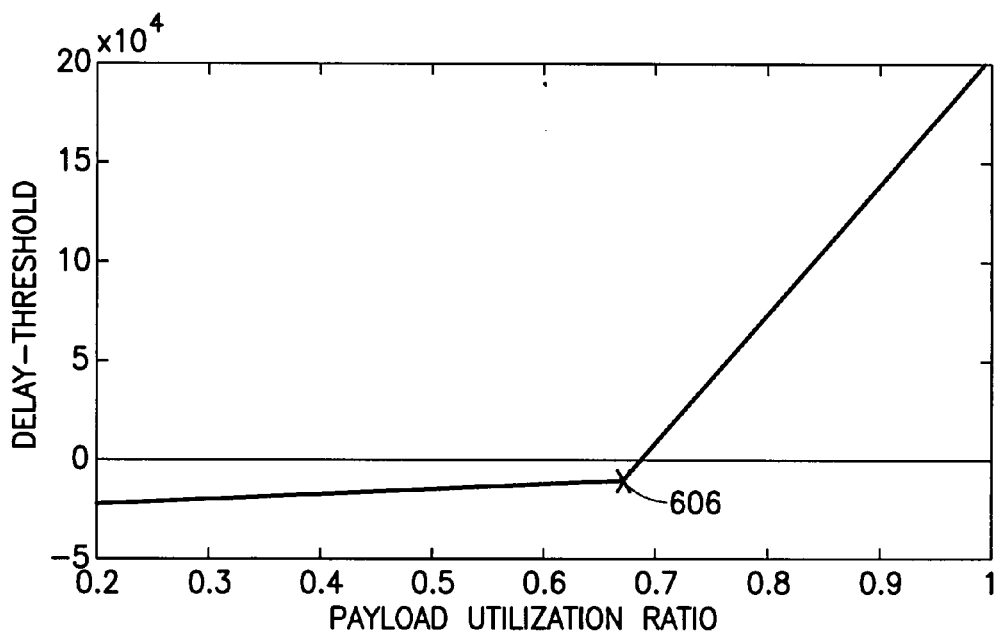

In FIG. 6 another graph is plotted when the value of $N_h$ is such that the probability to exceed the delay is less than 0.1% (see EQUATIONS 9 and 10). The optimum value of payload utilization in this case is 67.5% (606).

Figure 7:
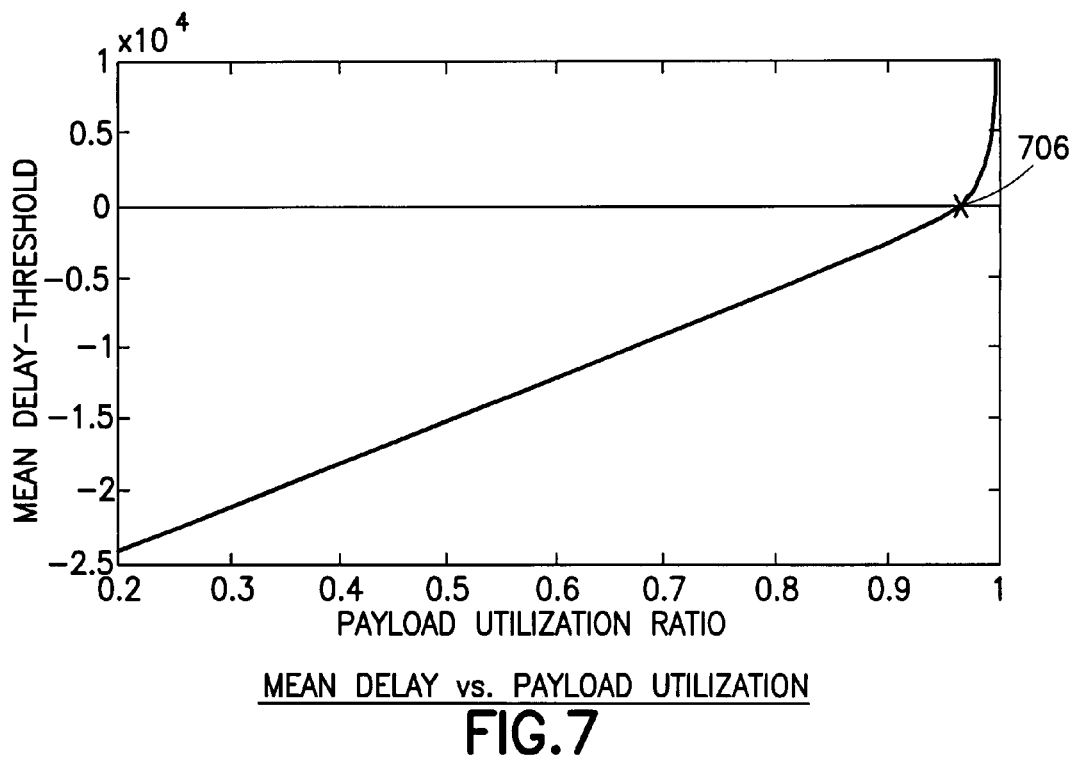
FIG. 7 illustrates the mean delay vs. payload utilization.

Finally, FIG. 7 plots the case when the mean delay needs to be less than the delay threshold. The optimal payload utilization in this case is about 96% (706).

Dividing the wireless link in a payload plane and a bursty traffic plane yields an increased efficiency over the CBR allocation scheme. Yet, all calls in such a scheme still offer to the user some guaranteed quality of service, since the delay is bounded and the payload allocation is dedicated CBR which is protected from the traffic of the other users.

C. Shared Channel

In this subsection, the case of a totally shared channel, with no distinction between the header bursts and the payload traffic is considered. In this situation, corresponding to a Wireless LAN for instance, there is no allocation of the resource to the users, and the users simply obtain the available bandwidth. The traffic model is not easily tractable in this case, since even though the requests for connection arrive according to a Poisson process, the load that each request brings varies after some time due to header compression. That is, it is not possible to dissociate the initial burst from the rest of the traffic.

Figure 8:
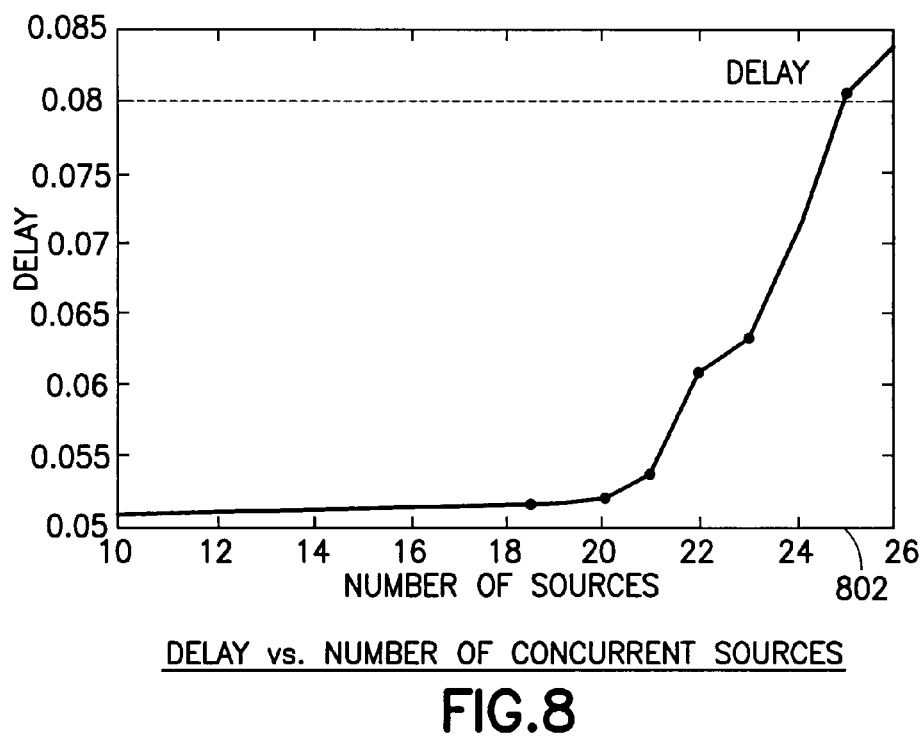
FIGS. 8 and 9 show the delay vs. number of concurrent sources, in accordance with aspects of the invention.

The simulation deals with a wireless link of capacity 300 kbits/s, and users requesting connections for calls of bandwidth $\beta$=24 bytes per 20 ms plus the headers: 1 byte for second order, 4 bytes to first order and 84 bytes for the full header. The number of concurrent users (802) in FIG. 8 is increased the delay is considered. The delay of the link is set at 50 ms, and the value of $\delta$ is 30 ms. Each call requests a payload bandwidth of 9.6 kbits/s.

There is always a tradeoff in such systems between the delay and the packet dropping probability. The smaller the buffer, the shorter the delay, but the higher the packet drop.

Figure 9:
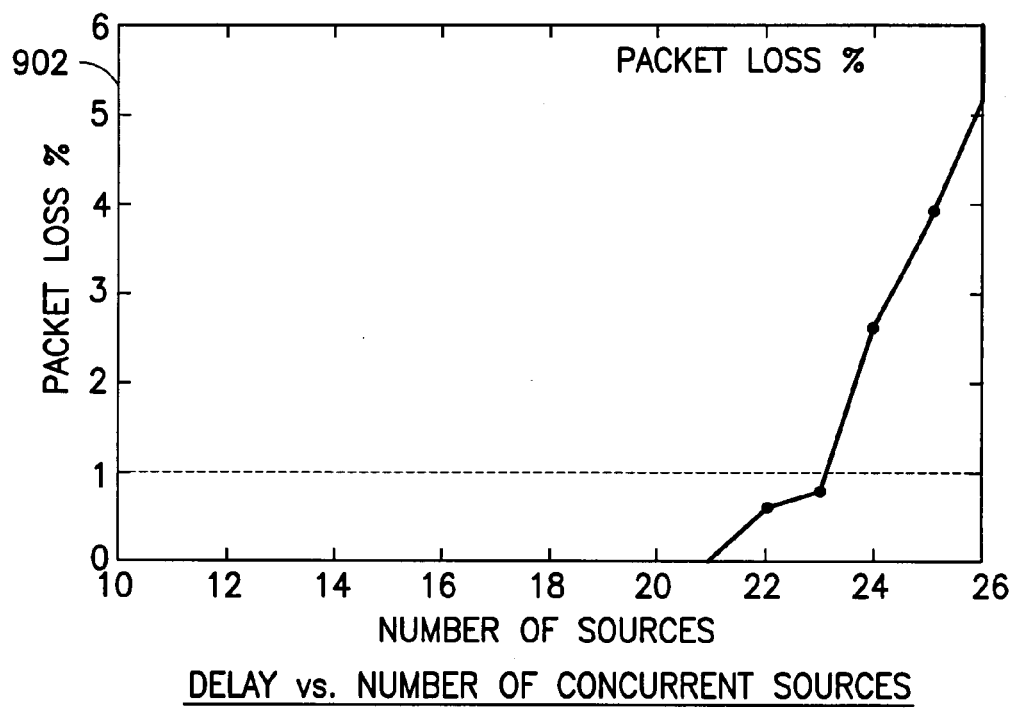

In FIG. 9, packet loss probability (902) is considered. A threshold of 1% is set beyond which the call is dropped due to degradation of the quality of service. From both FIGS. 8 and 9, it can be seen that the maximum number of calls using header compression in this system is 23, and that the payload utilization for this value is 23*9.6 kbits/300 kbits=0.736 (EQUATION 13). There is no exact way of comparing this with the shared signaling allocation. In section IV-B a range between 67.5% and 95% was found for different values of the probability $\epsilon$. However, the shared signaling offers some guarantees on the quality of service during a call by protecting one flow from the other once the header compression is VI. Conclusion Compression context establishment is extremely bursty, which leads to inefficiency in the utilization of the channel. This is especially acute in mobile networks where connections requesting context establishment arrive due to handovers. Channel allocation and/or connection admission control is complicated by the burstiness of the traffic. The channel allocation method presented above introduces a way to allocate bandwidth using the pattern in the traffic, or similarly introduces a way to make a CAC decision.

A context transfer scheme could transfer the header compression context from the previous router to the new router while the mobile node moves from one to the next. By avoiding the header compression context establishment, such a context transfer modifies the traffic pattern, and channel allocation (or CAC) should take this into account in the computation method to provision the channel's bandwidth. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method comprising:
   receiving a request for bandwidth $\beta$;
   allocating a first bandwidth greater than $\beta$ and forwarding a first set of packets using the allocated first bandwidth;
   determining a maximum acceptable delay for a second set of packets;
   determining from the maximum acceptable delay a second bandwidth that is less than the first bandwidth;
   compressing headers of packets of the second set of packets; and
   allocating the second bandwidth and forwarding the second set of packets with the compressed headers using the allocated second bandwidth.

2. The method of claim 1, wherein the first bandwidth exceeds $\beta$ by at least a size of an uncompressed packet header.

3. The method of claim 1, wherein the maximum acceptable delay comprises a probability of buffer overflow.

4. The method of claim 3, wherein the probability of buffer overflow comprises a probability that a number of requests for bandwidth $\beta$ due to handovers exceeds a maximum number of possible concurrent requests for establishing header compression contexts.

5. The method of claim 4, wherein the first bandwidth comprises $\beta(1+\alpha)$ and the maximum acceptable delay comprises;

$$n\left(\frac{H}{\beta(1+\alpha)} - \tau\right);$$

where α is an overallocation coefficient for a constant bit rate allocation, H is load of a header of a packet of the first set of packets that exceeds a compressed header, n is a number of packets of the first set of packets, and τ is an interarrival time of packets of the second set of packets.

6. The method of claim 1, wherein forwarding the first set of packets is over a shared channel and forwarding the second set of packets is over a dedicated channel.

7. The method of claim 6, wherein determining the maximum acceptable delay comprises determining a maximum number $N_{max}$ of concurrent requests for bandwidth β.

8. The method of claim 6, wherein determining the maximum acceptable delay comprises determining a number of packets $N_h$ requesting bandwidth β for which is allocated the first bandwidth and determining the maximum acceptable delay for the $N_h$ requesting packets.

9. The method of claim 8, wherein the maximum acceptable delay comprises, $$\frac{N_h n H}{(1-\alpha)\beta_T},$$

where α is an overallocation coefficient for a constant bit rate allocation, H is load of a header of a packet of the first set of packets that exceeds a compressed header, n is a number of packets of the first set of packets, and $\beta_\tau$ is the total bandwidth of all the $N_h$ requesting packets.

10. The method of claim 1, wherein forwarding the first set of packets is over a shared channel and forwarding the second set of packets is over a shared channel.

11. The method of claim 1, wherein the request for bandwidth β comprises a fetch on demand request from a mobile node, and forwarding the first set of packets and the second set of packets comprises forwarding them to the mobile node.

12. An apparatus comprising:
receiving means adapted to receive a request for bandwidth β;
processing means adapted to
  allocate a first bandwidth greater than β to a first set of packets;
  determine a maximum acceptable delay for a second set of packets;
  determine from the maximum acceptable delay a second bandwidth that is less than the first bandwidth;
  compress headers of packets of the second set of packets; and
  allocate the second bandwidth; and
sending means adapted to forward the first set of packets using the allocated first bandwidth and thereafter to forward the second set of packets with the compressed headers using the allocated second bandwidth.

13. The apparatus of claim 12 comprising an access router, wherein the stream of packet data comprises voice over Internet protocol packets, the receiving means comprises a modem coupled to the Internet and the sending means comprises a wireless transmitter.

14. The apparatus of claim 12, wherein the first bandwidth exceeds β by at least a size of an uncompressed packet header.

15. The apparatus of claim 12, wherein the maximum acceptable delay comprises a probability of buffer overflow.

16. The apparatus of claim 15, wherein the probability of buffer overflow comprises a probability that a number of requests for bandwidth β due to handovers exceeds a maximum number of possible concurrent requests for establishing header compression contexts.

17. The apparatus of claim 16, wherein the first bandwidth comprises β(1+α) and the maximum acceptable delay comprises;

$$n\left(\frac{H}{\beta(1+\alpha)} - \tau\right);$$

where α is an overallocation coefficient for a constant bit rate allocation, H is load of a header of a packet of the first set of packets that exceeds a compressed header, n is a number of packets of the first set of packets, and τ is an interarrival time of packets of the second set of packets.

18. The apparatus of claim 12, wherein the means for sending is adapted to forwarding the first set of packets over a shared channel and the means for sending is adapted to forward the second set of packets over a dedicated channel.

19. The apparatus of claim 18, wherein the processor is adapted to determine the maximum acceptable delay by determining a maximum number $N_{max}$ of concurrent requests for bandwidth β.

20. The apparatus of claim 18, wherein the processor is adapted to determine the maximum acceptable delay by determining a number of packets $N_h$ requesting bandwidth β for which is allocated the first bandwidth and thereafter to determine the maximum acceptable delay for the $N_h$ requesting packets.

21. The apparatus of claim 20, wherein the processor is adapted to determine the maximum acceptable delay by computing, $$\frac{N_h n H}{(1-\alpha)\beta_T},$$

where α is an overallocation coefficient for a constant bit rate allocation, H is load of a header of a packet of the first set of packets that exceeds a compressed header, n is a number of packets of the first set of packets, and $\beta_\tau$ is the total bandwidth of all the $N_h$ requesting packets.

22. The apparatus of claim 12, wherein the sending means is adapted to forward the first set of packets over a shared channel and the sending means is adapted to forward the second set of packets over a shared channel.

23. The apparatus of claim 12, wherein the request for bandwidth β comprises a fetch on demand request from a mobile node, and the sending means is adapted to forward the first set of packets and the second set of packets to the mobile node.

* * * * *